United States Patent [19]

Gadeken

[11] Patent Number: 5,410,152
[45] Date of Patent: Apr. 25, 1995

[54] LOW-NOISE METHOD FOR PERFORMING DOWNHOLE WELL LOGGING USING GAMMA RAY SPECTROSCOPY TO MEASURE RADIOACTIVE TRACER PENETRATION

[75] Inventor: Larry L. Gadeken, Houston, Tex.

[73] Assignee: Halliburton Energy Services, Houston, Tex.

[21] Appl. No.: 193,933

[22] Filed: Feb. 9, 1994

[51] Int. Cl.⁶ ............................................. G01V 5/04
[52] U.S. Cl. ................................... 250/260; 250/259
[58] Field of Search ............... 250/260, 259, 253, 256, 250/303

[56] References Cited

U.S. PATENT DOCUMENTS

| | | | |
|---|---|---|---|
| 4,504,736 | 3/1985 | Smith, Jr. et al. | 250/256 |
| 4,585,939 | 4/1986 | Arnold et al. | 250/256 |
| 4,825,073 | 4/1989 | Smith, Jr. et al. | 250/260 |
| 5,001,342 | 3/1991 | Rambow | 250/260 |

OTHER PUBLICATIONS

Gadeken, L. L. and Smith, Jr., H. D., *A Relative Distance Indicator from Gamma Ray Spectroscopy Measurements with Radioactive Tracers*, (SPE 17962) 6th SPE Middle East Oil Technical Conference and Exhibition, Manama, Bahrain, Mar. 11–14, 1989.

Gadeken, L. L. et al., *Calibration and Analysis of Borehole and Formation Sensitivities for Gamma Ray Spectroscopy Measurements With Multiple Radioactive Tracers*, 28th Annual SPWLA Symposium, London, England, Jun. 1987.

Gadeken, L. L. et al., *Improved Evaluation Techniques for Multiple Radioactive Tracer Applications*, 12th International Logging Symposium of SAID, Paris, France, Oct., 1989.

Gadeken, L. L. et al., *The Interpretation of Radioactive-Tracer Logs Using Gamma-Ray Spectroscopy Measurements*, The Log Analyst, vol. 32, No. 1, pp. 24–34, Society of Prof. Well Log Analysts, Jan.–Feb. 1991.

Brochure describing "TracerScan Service" by Halliburton Logging Services, Jan., 1990.

Smith et al., *A Multi-Function Compensated Spectral Natural Gamma Ray Logging System*, (SPE 12050), 58th Annual Technical Conference of SPE, San Francisco, 1983.

Gadeken & Smith, *TracerScan–A Spectroscopy Technique for Determining the Distribution of Multiple Radioactive Tracers in Downhole Operations*, The Log Analyst, Jan.–Feb. 1987, pp. 27–36.

*Primary Examiner*—Paul M. Dzierzynski
*Assistant Examiner*—Richard Hanig
*Attorney, Agent, or Firm*—Arnold, White & Durkee

[57] ABSTRACT

A method for evaluating the penetration of downhole materials such as proppant, casing annulus fill, or packed gravel by radioactively tagging the material, conducting well logging with gamma ray spectroscopy equipment to generate data signals, and applying an improved low-noise processing routine to the data signals to determine the material's penetration diameter. After hydraulic fracturing, gravel packing, or cementing operations are performed on a cased well, the well is logged using gamma ray spectroscopy techniques. In an exemplary embodiment, the resultant data signals are divided into channels, sent uphole, consolidated into depth intervals, and summed into specified energy windows. The spectra are processed by a weighted least squares technique to represent the spectra as borehole and formation component signals. The relationship between the borehole and formation component signals, which may be expressed as a borehole-formation angle, is then applied to an empirically determined relationship between the borehole-formation angle and mean penetration diameter to provide a penetration diameter signal to assist in evaluating the distribution of the materials pumped downhole.

34 Claims, 7 Drawing Sheets

LOW-NOISE METHOD FOR PERFORMING DOWNHOLE WELL LOGGING USING GAMMA RAY SPECTROSCOPY TO MEASURE RADIOACTIVE TRACER PENETRATION

BACKGROUND OF INVENTION

1. Field of Invention

The present invention relates to well logging using gamma ray spectroscopy. More particularly, the invention concerns a method for evaluating the penetration of materials such as proppant, casing annulus fill, or packed gravel by radioactively tagging the material, generating data signals by detecting gamma rays emitted by the tagged material, and applying an improved low-noise processing routine to the data signals to determine the tagged material's diameter.

2. Description of Related Art

"Hydraulic fracturing" is a well-known technique for increasing the amount of oil produced in an oil well. In hydraulic fracturing operations, a viscous "fracturing" fluid is forced down a cased, perforated oil well at high pressures. Fluids, such as crude oil, acid, water, or a variety of gelled liquids are typically used as fracturing fluids. The fracturing fluid exits the well through perforations in the casing, and then creates fissures or enters existing fissures in the strata adjacent to the well. The pressure applied to the fluid is increased until formation breakdown occurs, whereupon the fissures surrounding the oil well widen considerably. Injection is continued with a "proppant", which typically comprises a slurry of a selected grade of sand or gravel or particles of other material, such as alumina. After the hydraulic pressure is released, the proppant remains behind to "prop" the fracture open. The proppant may comprise a material such as sand, bauxite, ceramic, or another granular material. The fracturing fluid typically dissipates into the surrounding strata and the proppant provides a high-permeability path for the oil to reach the borehole.

In hydraulic well fracturing operations, it is important to know how far the fracturing fluid or the proppant has penetrated into the formation, radially outward from the borehole. Such information can be used for optimizing future fracturing operations in other wells in the vicinity, or for diagnosing post-stimulation problems. For example, if the fluid does not travel a sufficient distance into the strata away from the borehole, the resulting fractures may be inadequate in length to drain the reservoir of hydrocarbons to the extent desired. A similar problem occurs if the proppant fails to extend adequately into the fractures. In some cases, the proppant may "sand up" near or inside the borehole, rather than advancing into the outlying fractures, necessitating expensive removal operations.

In "gravel packing" operations, like hydraulic fracturing operations, it is important to understand the distribution of certain materials about the cased borehole. Gravel packing operations are performed in cased boreholes where there is a need to regulate the flow of hydrocarbon fluids into the well through the casing. One reason to regulate the fluid flow, for example, might be to achieve an optimal flow rate to more completely and efficiently drain the hydrocarbon reserves. In some gravel packing operations, material such as gravel is "pre-packed" through perforations in the well casing, adjacent to the regions of high fluid flow. This material is ultimately deposited in outlying volumes surrounding the casing, thereby restricting the flow of formation solids into the borehole with the hydrocarbon fluids.

In gravel packing operations, like hydraulic well fracturing procedures, it is important to know how far the gravel has penetrated into the formation. It is also useful to understand the extent of gravel placement between the gravel pack screen and the casing. If the gravel failed to adequately penetrate and fill the cavities surrounding the casing, the gravel may not restrict the pressure of solids to the extent desired.

Measurement of the distribution of certain materials about a cased borehole is also important in "annulus fill operations." Annulus fill operations involve placing a filler such as cement between the well casing and the borehole to secure the casing in place and to seal off formation strata, thereby preventing undesired formation fluids from leaking into the borehole. In annulus fill operations, it is often useful to analyze and understand the distribution of the filler about the well casing.

In hydraulic well fracturing, gravel packing, and annulus fill operations, radioactive tracers are commonly used to tag the fluid, proppant, gravel, or filler. Each of these radioactive tracers contains a material that emits a known spectrum of gamma rays. Typical tracers are Scandium ($^{46}$Sc), Antimony ($^{124}$Sb), or Iridium ($^{192}$Ir). After attempting to distribute one or more tagged materials, well site personnel conduct a gamma ray well log to measure and record the gamma ray energy distribution emanating from the radioactive tracer(s) as a function of depth. This permits petroleum engineers or geophysicists to estimate the distribution of the tracer(s), and hence the fluid, proppant, or filler.

For many years, radioactive tracers have been used to measure the distribution of materials about a borehole. Early techniques determined the location of a tagged material by conducting logging measurements with a "gross-counting" gamma ray tool, such as a Geiger counter. Although gross-counting tools are sensitive to the overall presence of gamma rays, they are not responsive to the individual gamma ray energy signatures characteristic of different tracers. Therefore, although gross-counting tools have been useful for some applications, their usefulness is limited in other applications since they are only sensitive to overall vertical variations of the tracers.

More recently, though, scientists have learned that gamma ray spectroscopy tools are helpful in measuring the distribution of downhole materials, and especially beneficial in overcoming the limitations of gross-counting tools. Even for a single tracer, the observed gamma ray energy spectrum contains information about the radial distribution of the tagged·material surrounding the borehole. For instance, known gamma ray spectroscopy techniques are sometimes used to determine whether a tagged material has been deposited in the borehole, or whether it has been disposed of beyond the casing as desired. Gamma ray spectroscopy is also beneficial since it can be used to detect two or more tracer isotopes with distinct gamma ray signatures. This is often beneficial, for example, in complex fracturing operations where multiple zones are fractured or where fracturing fluids are injected in several stages. In these situations, it may be desirable to inject and monitor multiple tracers in the fracturing operations.

Multiple-tracer operations may be implemented in a number of different ways. For example, different radioactive isotopes may be injected into different zones, or at different stages of the operation. Or, different radioactive isotopes may be used to tag different components of the fracturing material. For example, one isotope may be used to tag the fracturing fluid with another isotope being used to tag the proppant. By monitoring each of these radioactive tracer isotopes, scientists can more accurately understand the effectiveness of the fracturing operation, especially in determining the depth, extent, and radial location of the fractures. Moreover, witch multiple tracers, a single logging pass is often sufficient to identify the individual tracers and provide sufficient raw data to evaluate the effectiveness of the job.

To glean as much information as possible from gamma ray spectroscopy, scientists have developed more and more sophisticated analysis techniques. Many early multiple tracer operations used a spectrum-stripping method, as discussed in Gadeken & Smith, "TracerScan, A Spectroscopy Technique for Determining the Distribution of Multiple Radioactive Tracers in Downhole Operations," The Log Analyst (January–February 1987), pp. 27–36.

The spectrum-stripping method was later improved with a weighted least squares analysis, based in part upon laboratory tests performed under simulated field conditions. The weighted least squares analysis helped geophysicists to achieve tracer logs that were more accurate and less statistical.

Along these lines, one especially useful technique for performing gamma ray well logging is disclosed in U.S. Pat. No. 4,825,073 ('073), entitled "Method for Determining Depth of Penetration of Radioactive Tracers in Formation Fractures," which issued to Smith, Jr. et al. on Apr. 25, 1989. The '073 patent is hereby incorporated herein by reference in its entirety. The '073 patent is concerned with measuring a tracer's penetration from the borehole (i.e., its "relative distance") as a function of depth.

Figure 1A:
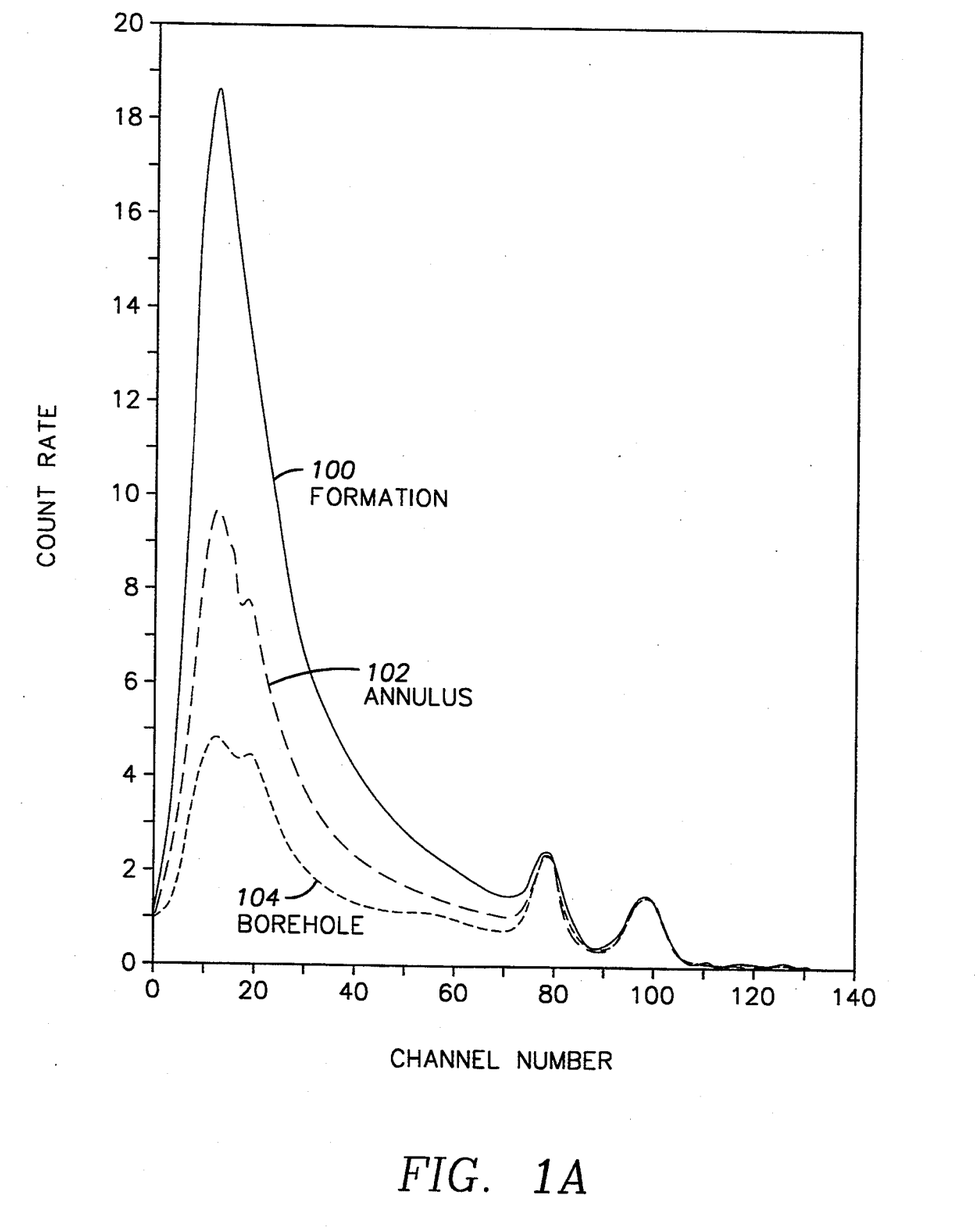
FIG. 1A is a graph of "basis spectra" corresponding to formation 100, cement annulus 102, and borehole 104 portions of a tracer-tagged material.

As explored by Smith, Jr. et al., the gamma ray energy spectra for formation 100, cement annulus 102, and borehole 104 portions of a tracer-tagged operation can be measured separately in the laboratory to generate individual "basis spectra" (FIG. 1A). The principal scattering mechanism of gamma rays of low energies (e.g. 0.2–2.0 Mev) is the "Compton effect," where the Compton-scattered part of a gamma ray spectrum contains information about the distance gamma rays travel between emission and detection. These phenomena, as explored by Smith, Jr. et al., are useful in measuring a tracer's relative distance from the detector. In this respect, the borehole gamma rays 104 are least affected by Compton scattering and the formation gamma rays 100 are most affected by Compton scattering. This is true since gamma rays that travel from the formation into the borehole necessarily pass through, and are potentially scattered by, more atoms of the intervening material during that journey.

To determine a tracer's relative distance, the tracer's "Compton Ratio" is first measured, where Compton Ratio refers to a count rate in a specified high-energy portion of the spectrum divided by a count rate in a specified low-energy portion of the spectrum, where the effects of Compton scattering will predominate. After determining the tracer's Compton Ratio, the relationship between the tracer's relative distance and that tracer's Compton Ratio is established. Then, this relationship is applied to a gamma ray log for a given depth to provide a relative distance log for the depth range.

This process is addressed in detail in the '073 patent, as well as Gadeken et al., "Calibration and Analysis of Borehole and Formation Sensitivities for Gamma Ray Spectroscopy Measurements with Multiple Radioactive Tracers," presented at 28th Annual SPWLA Symposium, London, England (1987).

More particularly, the technique of Smith, Jr. et al. employs a weighted least squares technique to process data obtained from the gamma ray log. The weighted least squares technique assumes that only "borehole" and "formation" regions contain tagged materials. The borehole region is used to refer to the region inside the borehole, and the formation region is used to refer to the region outside the cement annulus. For each isotope, the weighted least squares process calculates the borehole and formation components. The total detected isotope concentration may be obtained by summing the borehole and formation components.

Figure 1B:
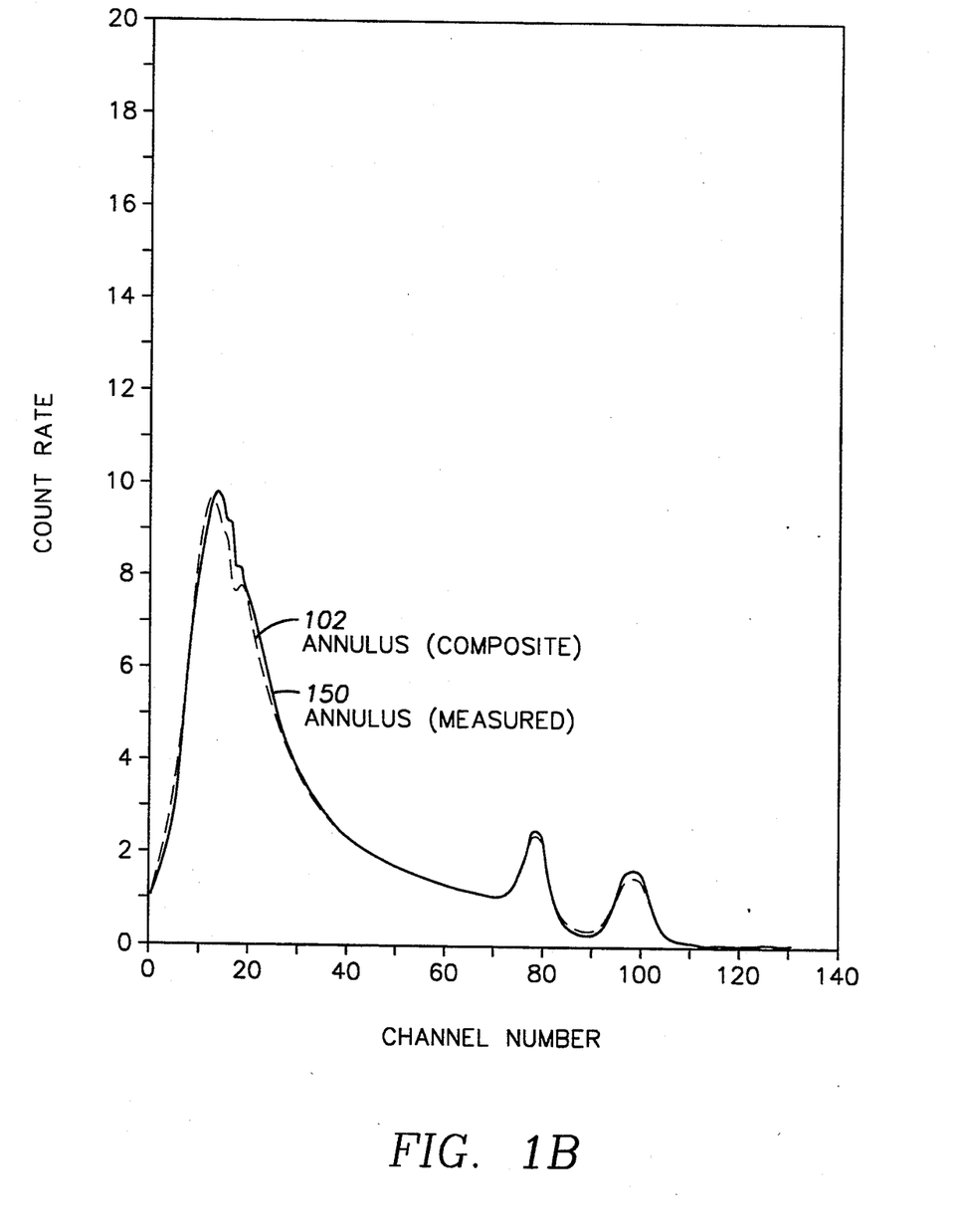
FIG. 1B is a graph of "composite spectra" for an exemplary distribution of a tagged material.

It has been established that other tracer distributions may be accurately approximated by a linear combination of the borehole and formation components yielded by the weighted least squares analysis. For example, FIG. 1B illustrates the similarity between the cement annulus spectrum 102 and a composite spectrum 150 generated by summing 39% of the borehole spectrum 104 with 61% of the formation spectrum 100. The borehole and formation percentages were obtained as output from the weighted least squares procedure when the measured annulus spectrum was used as the input. This demonstrates that a composite spectrum is a close estimate of the actual gamma ray spectrum for a specific isotope that is actually in an intermediate annular location. This illustrates the usefulness of the "basis spectra" approach in this implementation of the weighted least squares process.

An appropriate composite spectrum is presumably a close estimate of the actual gamma ray spectrum for a specific isotope. Using an appropriate composite spectrum, a Compton Ratio is computed by summing the gamma ray counts in high energy region (e.g. 350 keV to 3000 keV), and dividing that quantity by the sum of gamma ray counts in a low energy region (e.g. 150 keV to 350 keV). The resulting Compton Ratio calculation is inversely proportional to the square of the annular diameter of a cylindrical region containing the tracer isotope, as taught in the '073 patent. This estimate of annular diameter, called "relative distance", is proportional to the mean radial distance between the measuring tool and the tracer material. Compton Ratio techniques are addressed in Gadeken & Smith, "A Relative Distance Indicator from Gamma Ray Spectroscopy Measurements with Radioactive Tracers," SPE 17962 (1989), as well as the "Calibration and Analysis of Borehole and Formation Sensitivities . . . " paper identified above. These papers are hereby incorporated by reference in their entirety.

The use of analysis techniques based on Compton Ratio calculations provides a great deal of beneficial information for users in the applications such as the foregoing. However, due to the details of the implementation of the Compton Ratio technique, the results are not entirely satisfactory, due to a number of reasons.

One potential problem with Compton Ratio techniques concerns the interpretation of data. Generally, the matrix inversion of the weighted least squares process rarely exhibits instability or singularity characteristics. This means that negative borehole and/or formation components will not usually disturb the computations. However, interpreting negative components may be a problem in some situations. Basically, a negative formation component indicates that the specified tracer isotope is closer to the tool than occurred in the laboratory, i.e. uniformly tagged water inside a cased borehole. Similarly, a negative borehole component means that the isotope is more distant from the tool than occurred in the laboratory conditions (i.e. a uniformly distributed tracer in a cylindrical annulus from the cement column to the outer limit of the tool response).

Thus, a negative borehole component may indicate an inner annular diameter that is greater than the outer diameter of the cement column. If both borehole and formation components are negative, however, a physical interpretation is not possible. This situation arises most often when multiple isotopes are used (e.g. 2-3 isotopes), due to statistical variations or data transmission infidelities.

The linear relation between Compton ratio and radial distance, is shown in Equation 1 (below).

$$R_c = A + B/d^2 \quad [1]$$

where:
$R_c$ = Compton Ratio,
A = a constant that depends on the specific isotope and the measurement geometry,
B = a constant that depends on the specific isotope and the measurement geometry, and
d = relative distance.

The relationship of Equation 1, however, is only truly accurate for a specific annular geometry. Specifically, the constants A and B are determined for each different casing size. Once the constants A and B are established for a particular model, the relationship of Equation 1 will still be generally true in actual field conditions. However, since the actual downhole geometry may be unknown, and since the tracer distribution may be different than that of the laboratory, the values of the constants A and B may be inaccurate in the field. This condition therefore requires an interpretation analyst to manipulate A and B to ensure that Equation 1 yields reasonable estimates of relative distance.

Additionally, the construction of the composite spectrum for each isotope is subject to statistical variations. This results in rather significant variations of the Compton Ratio from the relative distance calibration measurements. For example, negative values of the Compton Ratio can be observed for some individual isotopes, especially where more than two isotopes have been used.

Moreover, Compton Ratio methods may not be entirely satisfactory in some applications due to the level of noise in the relative distance log. Noise is inherent in the nature of the processes resulting in the emission and detection of gamma ray photons. However, it is exacerbated by the division of one count rate by another in the Compton Ratio technique.

Known Compton Ratio methods, then, are not as useful as required, since such methods often require especially accurate, and intuitive log interpretation techniques. In addition, Compton Ratio techniques can be time consuming especially when multiple isotopes are used, because several iterations with different values of A and B may be necessary to obtain a valid log interpretation. Furthermore, Compton Ratio techniques may not be as accurate as desired due to the influence of noise.

SUMMARY OF INVENTION

This invention concerns a low-noise method for evaluating the penetration of proppant, gravel packing, annulus filler, or other materials distributed about a borehole, by radioactively tagging the material, detecting gamma rays emitted by the tagged material to generate data signals, and applying certain processing steps to the data signals.

In accordance with the invention, hydraulic well fracturing, gravel packing, or annulus fill operations are conducted on a cased oil well using proppant, gravel, or filler that has been tagged with one or more radioactive isotopes, such as Scandium, Iridium, or Antimony. After the fracturing, packing, or annulus fill operation is complete, the well is logged using energy sensitive gamma ray equipment. In an illustrative embodiment, the logging tool is lowered to the bottom the well and then raised while the tool detects gamma rays emanated from the borehole fluids, the casing annulus, and the surrounding formation. In response to these gamma rays, the tool produces electric data signals, which are transmitted to the surface for processing pursuant to the invention.

In an illustrative embodiment, a downhole computer divides the data signals into a number of different channels, where each channel corresponds to a different energy boundary. Then, these signals are transmitted to the surface where another computer consolidates the spectra of the digital signals into depth intervals, and reduces the noise present in each consolidated signal corresponding to a different depth.

Next, the spectra are summed into a number of windows, where each window corresponds to a specified energy range. A weighted least squares process is then applied to the summed, windowed signals to estimate the concentrations of gamma ray isotopes present. In the present invention, the amount of each isotope is broken down into borehole and formation components. These two components allow a borehole-formation angle to be determined.

Then, the borehole-formation angle is used to determine the mean diameter of the tagged materials penetration into the formation. This distance, called the "penetration diameter," is determined based on empirical relationships determined in the laboratory, as well as actual data obtained in oil wells. The "penetration diameter" represents the diameter of the isotope's penetration outward from the borehole at a particular depth.

The present invention provides its users with a number of advantages, such providing data with less noise than previous techniques. The invention is also beneficial, in contrast to previous techniques, since it eliminates the need for intervention by analysts, and the need for time-consuming steps required to interactively reprocess data.

BRIEF DESCRIPTION OF DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF A PREFERRED EMBODIMENT

Structure

The present invention may be implemented by collecting downhole gamma ray data with any one of several known gamma ray logging systems, and processing the gathered data with the novel techniques of the present invention, as described herein. Some preferred gamma ray logging systems, for example, include the Compensated Spectral Natural Gamma Ray (CSNG TM) and the TracerScan TM logging systems, which are manufactured with outer diameters of 3⅜ and 1 11/16 inches, respectively. (CSNG and TracerScan are trademarks of Halliburton.) Additionally, other logging systems known to those skilled in the art may also be acceptable for gathering data in accordance with the invention.

Figure 2:
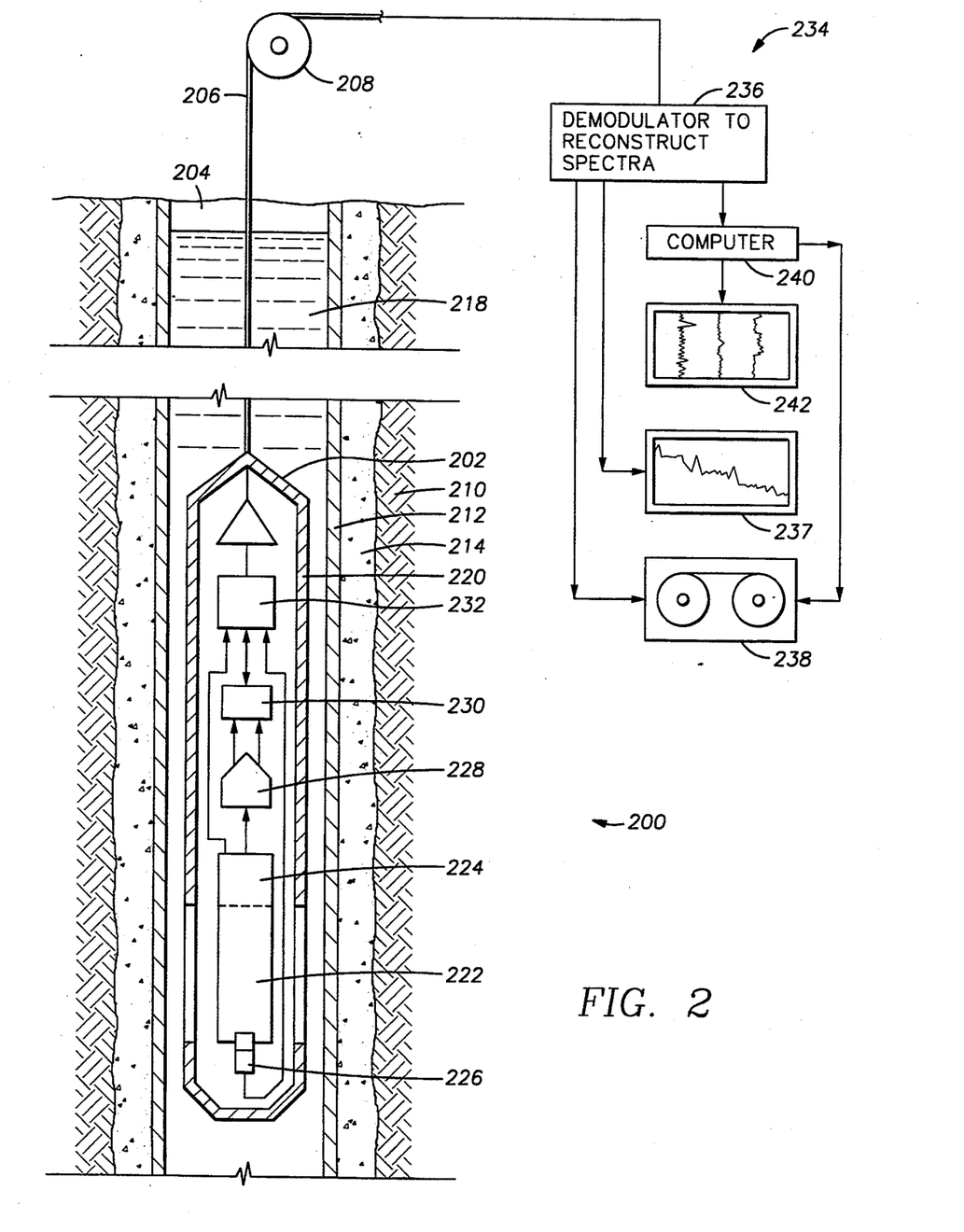
FIG. 2 is a block diagram of an illustrative gamma ray logging system for implementing the present invention.

For purposes of the present disclosure, the invention will be described in the context of an exemplary implementation, which comprises a gamma ray logging system 200 (FIG. 2). This system is effective for detecting radioactive tracers that have been artificially injected into formations, as well as radioactive substances that naturally occur in the formations. The invention may also be carried out with various known hardware arrangements, such as the systems described in the following materials, which are hereby incorporated by reference in their entirety: U.S. Pat. No. 4,585,939 ('939), entitled "Multi-Function Natural Gamma Ray Logging System", which issued to Arnold et al., on Apr. 29, 1986; and (2) Smith et al., "A Multi-Function Compensated Spectral Natural Gamma Ray Logging System," Paper 12050 presented at the SPE 58th Annual Technical Conference, San Francisco, Calif. (1983).

The logging system 200 comprises a logging tool 202 that is suspended in a well borehole 204 by a logging cable 206, which is supported by a surface reel 208. In one exemplary implementation, the borehole 204 traverses earth formations 210 and is lined with a tubular steel casing 212 that is cemented in place by a cement annulus 214. Although the region between the casing 212 and the formation 210 is referred to herein as a "cement" annulus 214, the corresponding region may also define a cavity, or be filled with a non-cement securing medium. Moreover, the invention may also be implemented in open hole (i.e., uncased) environments.

The casing 212 contains a borehole fluid 218. The cable 206 may be extended or retracted to lower or raise the tool 202 according to a number of conventional techniques, such as by rotating the reel 208, which may be supported on a skid unit or a truck (not shown). The length of cable extended into the borehole is monitored to provide an approximation of borehole depth, as the cable 206 is shortened or lengthened.

The tool 202 includes a toolcase 220, an exemplary embodiment of which is disclosed in U.S. Pat. No. 4,504,736 ('736), entitled "Gamma Ray Spectral Tool For Borehole Use", issued to Smith, Jr. et al. on Mar. 12, 1985. The '736 patent is hereby incorporated by reference in its entirety. In high temperature, high pressure applications, the toolcase 220 may be made of Titanium. In other instances, a smaller diameter steel tool housing may be used if photoelectric measurements are of relatively less importance.

A large crystal 222 is employed to detect incident gamma rays from tracers injected into the strata, as explained below. In an illustrative embodiment, the crystal 222 may be manufactured from compounds such as Sodium Iodide, Bismuth Germanate, or Cesium Iodide. Certain known gain stabilization techniques may be used, if desired.

Scintillations from the crystal 222 are coupled to a low noise photomultiplier tube 224 to produce electrical data pulses having amplitudes proportional to the energies of the impinging gamma rays. Electrical signals from the photomultiplier tube 224 are then directed to an electronic amplifier (not shown) and then to an analog-to-digital converter ("ADC") 228, which digitizes the electrical data pulses. After a data buffer 230 stores the digitized pulses, a microprocessor 232 sorts the stored pulses to assist a telemetry system (not shown) in periodically transmitting data signals to surface equipment 234. The microprocessor 232 may, in an illustrative embodiment, employ a processing scheme such as shown in the '939 patent.

At the surface, a demodulator 236 demodulates data signals received from downhole, and the demodulated data signals are displayed on a display device 237 and recorded with a recorder 238 such as a magnetic tape recorder. Additionally, data signals from downhole are processed by a computer 240 and the processed signals are displayed on a second display device 242. Each of the display devices 237, 242 may comprise, for example, a multi-channel analyzer, spectral display device, computer monitor, mechanical or thermal plotter, film recorder, or another suitable device for visually displaying data signals. In an illustrative embodiment, the computer 240 may be an appropriately programmed, commercially available, mini or micro computer of a type known to those skilled in the art.

Operation

Figure 3:
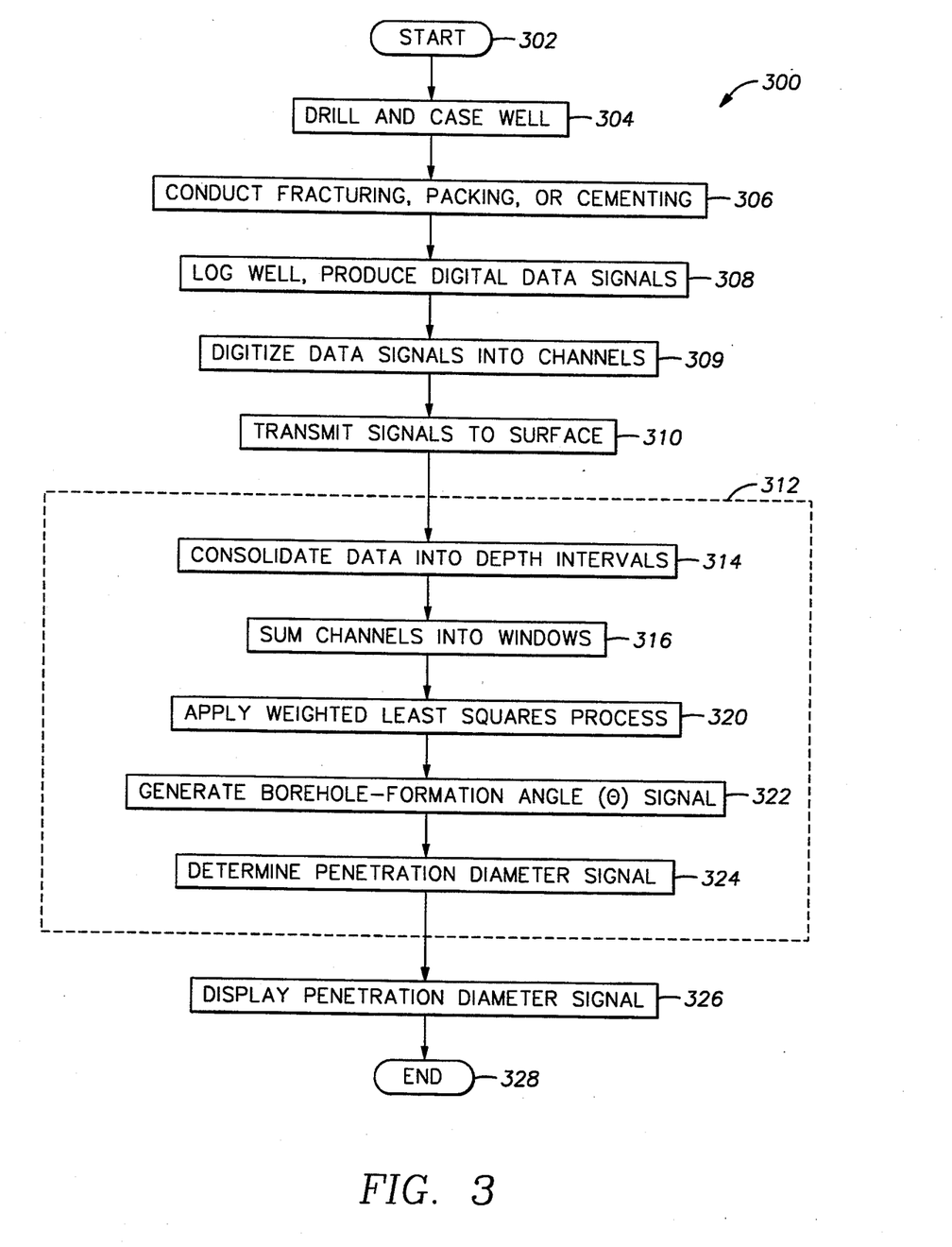
FIG. 3 is a flowchart illustrating a routine for carrying out an exemplary embodiment of the present invention.

The invention may be implemented by performing a series of tasks 300, such as the illustrative routine shown in FIG. 3. In an exemplary embodiment, many of the tasks 300 may be implemented using the computer 240 to execute a number of programming lines, such as FORTRAN source code. After the tasks 300 are started in task 302, a well is drilled and cased in task 304. The drilling and casing operations may be conducted pursuant to any one of various known techniques. After task 304, hydraulic well fracturing, gravel packing, or annulus filling operations are conducted in task 306, using proppant, gravel, or cement that has been tagged with one or more radioactive isotopes. Some exemplary isotopes comprise Gold, Antimony, Iridium, and Scandium. If desired, multiple isotopes may be advantageously employed by tagging different materials with different isotopes, to independently track the materials. However, in some applications, it may be desirable to use just a single isotope. A list of exemplary isotopes is shown below in an attached Appendix, which is hereby incorporated herein by reference in its entirety.

After the fracturing, packing, or filling operations of task 306 are complete, the well is logged in task 308. In an exemplary embodiment, the well logging of task 308 may be performed according to a known wireline logging technique such as Halliburton's TracerScan technique, using a tool such as a TracerScan or CSNG tool. In this procedure, the logging tool 202 is lowered to the well's "total depth", and then raised while the tool 202 takes various measurements. More specifically, the crystal 222 detects gamma rays emitted by the borehole fluids, the cement annulus 214, and the surrounding formation 210. In response to these gamma rays the crystal 222 produces light pulses, which the photomultiplier 224 converts into analog data pulses.

Also in task 308, the ADC 230 digitizes each analog pulse. In particular, for each analog pulse, the ADC 230 produces a digital signal representative of the maximum amplitude of the analog pulse. In an illustrative embodiment, the ADC 230 provides a digital output signal corresponding to gamma ray energies of 0-3 MeV.

After the ADC 230 digitizes the analog pulses, the microprocessor 232 in task 309 divides the digitized pulses into channels. This is accomplished by dividing the range of 0-3 MeV into a number of specified energy ranges, and counting the number of pulses occurring in each range. For example, the range of energies between 0-3 MeV may be divided into 256 channels of equal size, where each channel corresponds to about 12 keV. Although task 309 is discussed as occurring downhole, it may be performed at the surface instead.

Next, in task 310, the tool 202 sequentially transmits data signals corresponding to the values the channels uphole to the surface equipment 234 via the cable 206. In an alternate embodiment, where the data pulses are divided into channels at the surface, the tool 202 may transmit electric signals directly from the ADC 232 uphole for later processing by the surface equipment 234. Or, in still another alternate embodiment, the raw analog signals from the photomultiplier 224 may be transmitted uphole for subsequent processing at the surface.

After task 310, the computer 240 begins to process the digitized signals by performing a series of processing steps 312. In an illustrative embodiment, the processing series 312 is performed in "real time" as signals are received from downhole, and various signals are stored in the recorder 238 at predetermined intervals.

The processing steps 312 begin in task 314, where the computer 240 consolidates the spectra of the digitalized signals into depth intervals. This task is performed to further reduce the amount of noise in the data signals, and may be accomplished by consolidating the digitized signals into depth intervals of about 3 inches. This may be carried out, for example, by selectively weighting the data from each depth interval by the data from neighboring depth intervals. Some illustrative methods include triangle weighting, moving block averaging, or polynomial curve fitting.

Then, in task 316, the computer 240 rearranges the signals for each depth into a number of windows, where each window corresponds to a different range of gamma ray energy. This task is beneficial in reducing the amount of noise in the data, and in reducing the steps needed to implement a weighted least squares procedure (described below). In an exemplary embodiment, 13 windows are used, as shown in Table 1 (below). As shown in Table 1, the extent of the individual windows may be adjusted as desired to select boundaries of the gamma ray energy spectra which contain one or more distinct photopeaks corresponding to the energies of the detected gamma rays.

TABLE 1

| WINDOW NUMBER | ENERGY RANGE (keV) |
|---|---|
| 1 | 130-200 |
| 2 | 200-270 |
| 3 | 270-335 |
| 4 | 335-520 |
| 5 | 520-700 |
| 6 | 700-850 |
| 7 | 850-1050 |
| 8 | 1050-1300 |
| 9 | 1300-1650 |
| 10 | 1650-1950 |
| 11 | 1950-2200 |
| 12 | 2200-2500 |
| 13 | 2500-3000 |

Next, in a preferred embodiment, task 320 applies a weighted least squares process to the windowed signals. The use of the weighted least squares technique is addressed in the '939 patent, as well as in the "Calibration and Analysis of Borehole Sensitivities . . ." paper identified above. As an alternative to the weighted least squares approach, other known minimization procedures may be used, such as the "maximum entropy" technique. The weighted least squares process may be implemented as shown in Equations 2-5 (below).

$$[C] = [A] \cdot [M] \quad [2]$$

$$[C] = \begin{bmatrix} c_1 \\ c_2 \\ c_3 \\ \cdot \\ \cdot \\ \cdot \\ c_m \end{bmatrix} \quad [3]$$

$$[A] = \begin{bmatrix} a_{1-Sc-BH} & a_{1-Sc-FM} & a_{1-Au-BH} & a_{1-Au-FM} & a_{1-NGR} \\ a_{2-Sc-BH} & a_{2-Sc-FM} & a_{2-Au-BH} & a_{2-Au-FM} & a_{2-NGR} \\ \cdot & \cdot & \cdot & \cdot & \cdot \\ \cdot & \cdot & \cdot & \cdot & \cdot \\ \cdot & \cdot & \cdot & \cdot & \cdot \\ a_{m-Sc-BH} & a_{m-Sc-FM} & a_{m-Au-BH} & a_{m-Au-FM} & a_{m-NGR} \end{bmatrix} \quad [4]$$

$$[M] = \begin{bmatrix} m_{Sc-BH} \\ m_{Sc-FM} \\ m_{Au-BH} \\ m_{Au-FM} \\ m_{NGR} \end{bmatrix} \quad [5]$$

In Equations 2 and 3, [C] represents a 1-by-m count rate matrix of individual windows' count rates. For instance, in the present example, m would be 13, and [C] would contain the count rates for the 13 windows of Table 2. In Equations 2 and 4, [A] represents a 5-by-m sensitivity matrix of sensitivity matrix elements.

The sensitivity matrix includes two columns for each isotope used to tag materials downhole: one column is associated with a borehole component (BH) of that isotope, and the other column corresponds to a formation (FM) component of that isotope. In this implementation of the weighted least squares technique, tagged materials are assumed to be presented only in "borehole" and "formation" regions, for the purpose of creating "basis" spectra associated with those regions. The borehole region is used to refer to the region inside the borehole, and the formation region is used to refer to the region outside the cement annulus. For each isotope, the weighted least squares process thus calculates the borehole and formation components, which provide the basis spectra. Subsequently, other tracer distributions may be accurately approximated by a linear combination of the basis spectra.

The fifth column of the sensitivity matrix corresponds to the "natural gamma ray" radioactive materials downhole. In an illustrative example, a certain combination of Thorium, Uranium and Potassium isotopes may be assumed to be present downhole.

In Equations 2 and 5, [M] represents a 1-by-m concentration matrix containing elements that correspond to the elemental concentrations of the isotopes downhole. The elemental concentrations in the matrix [M] may be represented, for example, in American Petroleum Institute (API) gamma ray units.

The sensitivity matrix [A] is initialized by using a laboratory configuration (discussed below) to simulate the expected downhole conditions. More specifically, the borehole of a test configuration is filled with a known elemental concentration of an isotope. The, the 13 window count rates are measured, and the sensitivity matrix is solved for the 13 sensitivity matrix elements ($a_{BH}$) corresponding to that isotope. Then, a formation region of the test configuration is filled with a known elemental concentration of the isotope, and the borehole region is emptied. In the same manner that the borehole sensitivity matrix elements are calculated, the formation sensitivity matrix elements ($a_{FM}$) are calculated. This process is repeated for each desired isotope to fill out the entire sensitivity matrix.

Therefore, since the elemental concentration of the test isotopes (and hence [M]) will be known, and the window count rates (and hence [C]) may be measured, the sensitivity matrix [A] may be established experimentally. Then, having established [A] and having conducted the actual downhole measurements described above, the elemental concentrations of tagging isotopes may be determined by "dividing" count rates measured downhole by the sensitivity elements established in the laboratory according to the weighted least squares process.

Thus, Equations 2–5 yield the borehole and formation components for each isotope used downhole. After task 320, the computer in task 322 determines a borehole-formation angle ($\theta$) for each isotope, which corresponds to a trigonometric relationship that is a function of the borehole and formation components of that isotope.

Figure 4:
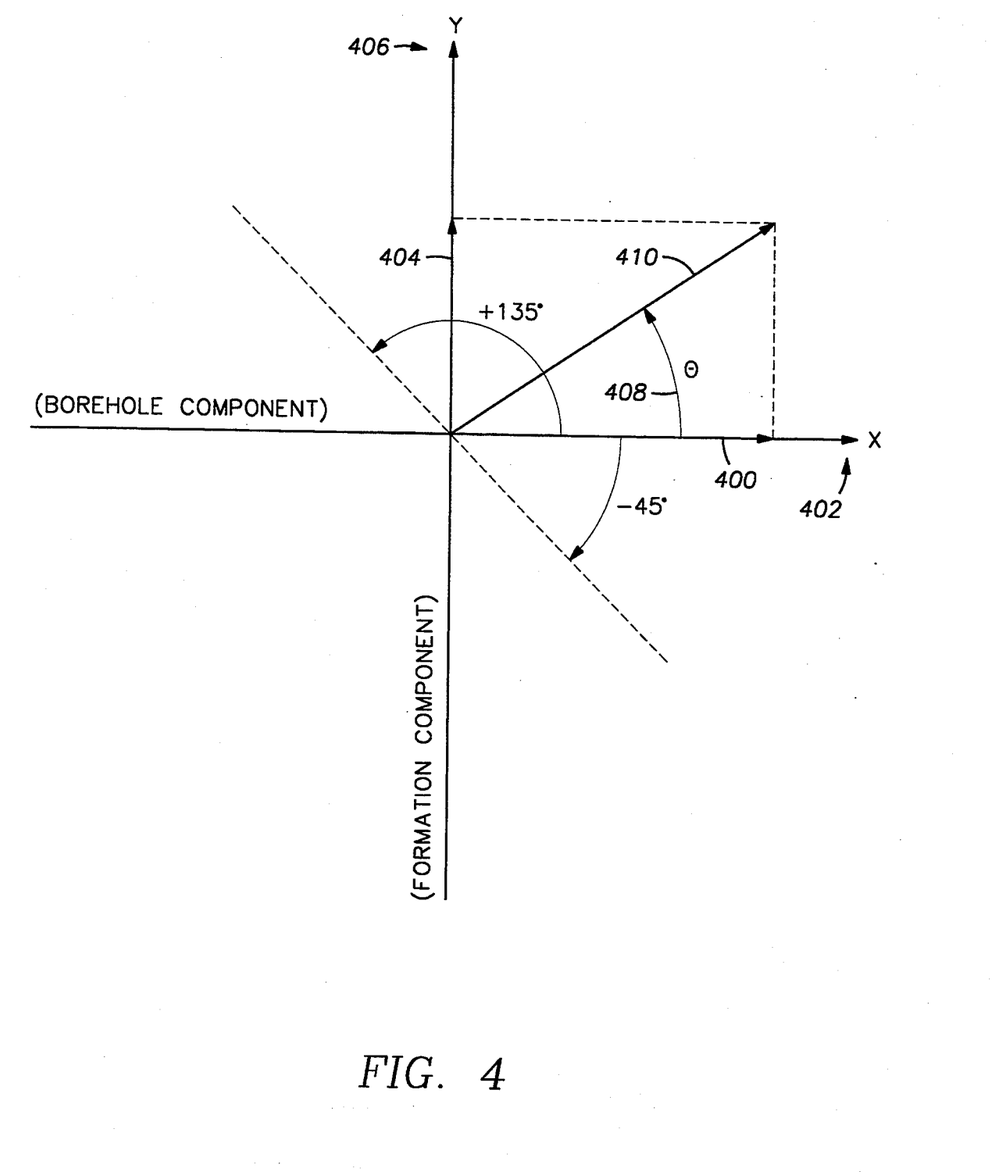
FIG. 4 is a diagram illustrating the method of determining borehole-formation angle.

In one illustrative embodiment, the borehole-formation angle ($\theta$) may be determined by taking the arc-tangent of the borehole and formation components, as shown in Equation 6 (below).

$$\theta(i) = \tan^{-1}\left(\frac{m_{i-FM}}{m_{i-BH}}\right) \quad [6]$$

where:
- $\theta(i)$ = the borehole-formation angle 408 for a specific isotope "i",
- $m_{i-FM}$ = the formation component 404 of the elemental concentration for the isotope "i", and
- $m_{i-BH}$ = the borehole component 400 of the elemental concentration for the isotope "i".

For easy understanding, this embodiment of the borehole-formation angle may be described graphically (FIG. 4). Specifically, the borehole component 400 may be plotted on an x-axis 402, and the formation component 404 may be plotted on a y-axis 406 (FIG. 4). The borehole-formation angle 408 then corresponds to the arc-tangent of these components.

The total elemental concentration of an isotope is the sum of the borehole and formation components 400, 404 for that isotope, as shown in Equation 7 (below).

Total Isotope Concentration = $m_{i-BH} + m_{i-FM}$      [7]

As shown in FIG. 4, the total isotope concentration 410 is positive when the borehole-formation angle 408 is between $-45°$ and $+135°$. Therefore, negative borehole or formation components are acceptable, so long as the total isotope concentration is positive. Tests with field data have indicated that borehole-formation angles 408 corresponding to negative total isotope concentrations (i.e., where $\theta < -45°$, or $\theta > +135°$) resulted, at least in part, from a combination of small total isotope concentrations and noise integrally associated with the downhole measuring operations. The range of positive isotope concentrations (i.e., $-45° < \theta < +135°$) is said to be the "physical range" of data.

In an alternate embodiment, the borehole-formation angle ($\theta$) may be determined according to Equations 8–10 (below).

$$\theta = \tan^{-1}\left[\frac{x}{y}\right] \quad [8]$$

and $$x = \frac{m_{i-FM}}{|m_{i-FM}|}\sqrt{|m_{i-FM}|} \quad [9]$$

$$y = \frac{m_{i-BH}}{|m_{i-BH}|}\sqrt{|m_{i-BH}|} \quad [10]$$

In this embodiment, the total elemental concentration of an isotope may be expressed as shown in Equation 11 (below).

Total Isotope Concentration = $x^2 + y^2 = m_{i-BH} + m_{i-FM}$      [11]

After task 322 calculates the borehole-formation angle 408, task 324 uses the angle to determine the isotope penetration diameter, using theoretical relationships, empirical relationships developed in the laboratory, or a combination of both. The "penetration diameter" represents the mean diameter of an isotope's penetration outward from the borehole at a particular depth. Since the present method is not direction sensitive, a distribution of an isotope near one side of the borehole will be assumed to be uniform about the borehole.

Under one approach, the relationship between borehole-formation angle and penetration diameter is determined experimentally. To implement this approach, a test configuration was constructed, with multiple concentric cylindrical regions capable of being filled with liquid and solid material. This configuration is explained in detail below. Different levels of isotope penetration were simulated, and the borehole-formation angle 408 was measured for each level using two different tools. In one embodiment, the penetration diameter signal is formed in task 324 by applying the borehole-formation angle of task 322 to such an experimentally-determined relationship.

Under another approach, a theoretical relationship between borehole-formation angle and penetration diameter is used. With this approach, the penetration diameter signal may be formed in task 324 by applying the borehole-formation angle of task 322 to such a theoretical relationship, or to a combination of the theoretical relationship and the experimentally-observed relationship. The theoretical and experimental relationships are explained in greater detail below.

After a penetration diameter signal is generated in task 324, the display device 242 is used to display the penetration diameter signal for a desired depth interval. As mentioned above, the display device 242 may use a number of different techniques to visually display the signal, such as electronically displaying the signal on a computer monitor or spectral display device, or mechanically displaying the signal with a plotter or film recorder or the like. After task 324, the routine 300 ends in task 326.

Borehole-Formation Angle & Penetration Diameter

Figure 5:
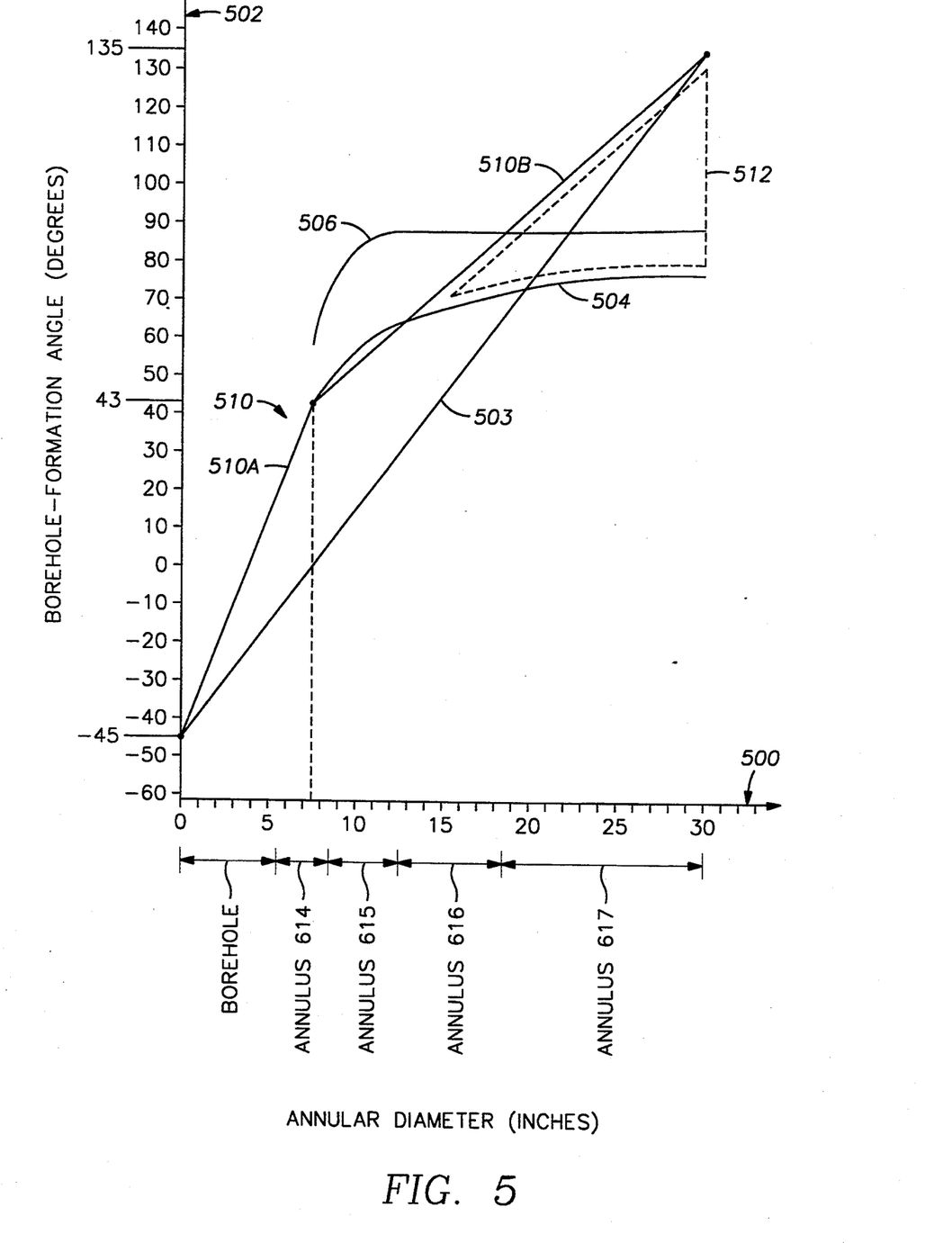
FIG. 5 is a graph showing an exemplary empirical relationship between penetration diameter and borehole-formation angle.
Figure 6:
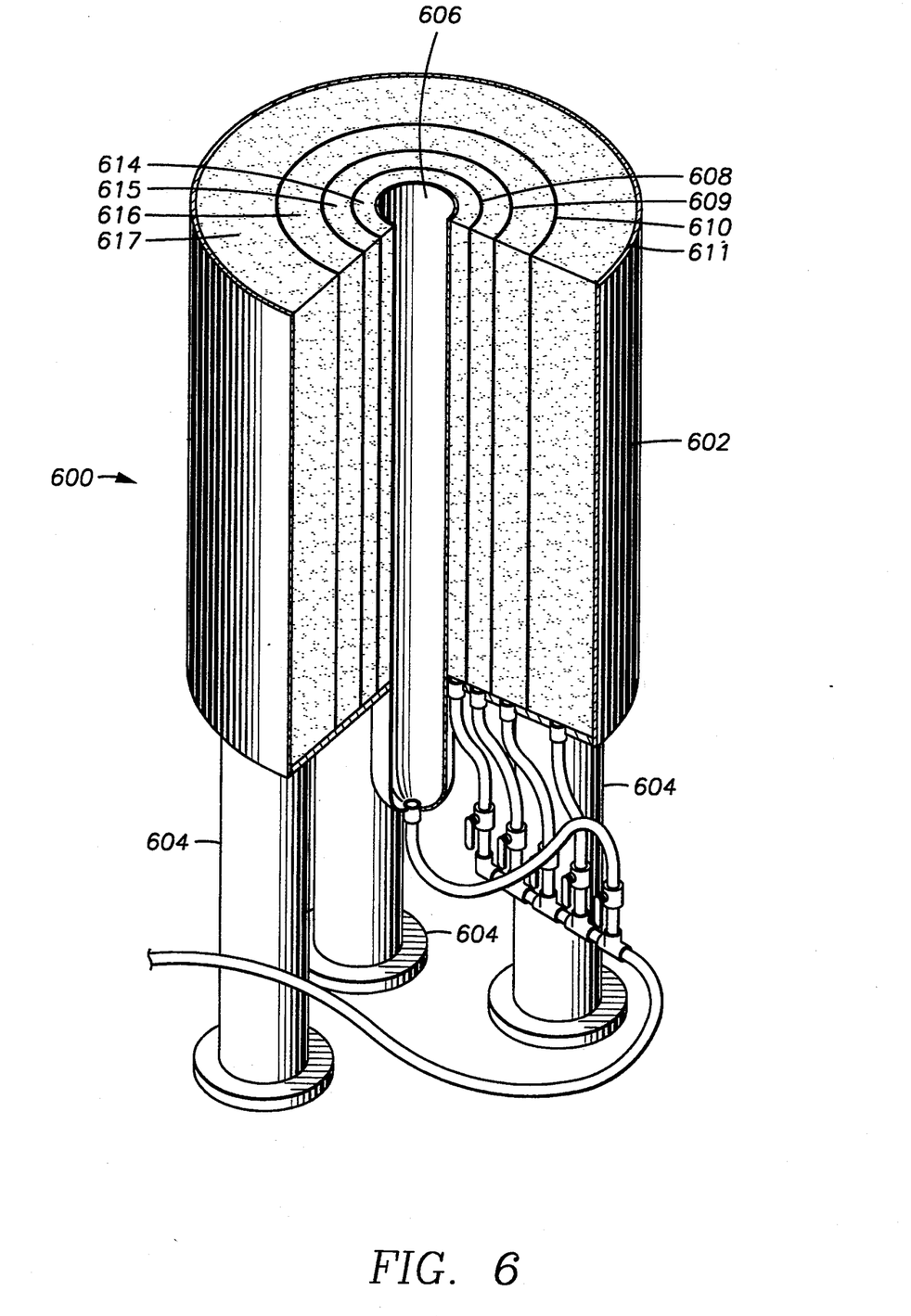
FIG. 6 is a diagram of an artificial test formation 900 used in a laboratory to assist in determining penetration diameter of tagged materials.

The experimental and theoretical relationships between borehole-formation angle and penetration diameter will now be explained in greater detail with reference to FIGS. 5-6. In the discussion hereinbelow, borehole-formation angles were determined according to the embodiment of Equation 6 (above). FIG. 5 depicts illustrative guidelines for determining penetration diameter from the borehole-formation angle determined in task 322. In FIG. 5, the horizontal axis 500 represents penetration diameter, and the vertical axis 502 represents borehole-formation angle determined according to Equation 6 (above). FIG. 6 illustrates an exemplary testing configuration for use in developing the guidelines shown in FIG. 5.

The testing configuration of FIG. 6 included a specially constructed artificial formation 600, including a number of concentric annular chambers to simulate annular regions about a borehole. The formation 600 included a steel tank 602 with a diameter of about 30 inches and a depth of about 36 inches. The tank 602 was mounted on four steel legs 604, having a length of about 30 inches. The center of tank 602 was welded to a casing 606, having a 5.5 inch diameter, a length of 60 inches, and a weight of 17 lb/ft. Concentric thin-wall stainless steel cylinders 608, 609, 610, 611 were welded in place to subdivide the tank 602 into separate annuli 614, 615, 616, 617.

The radial thickness of the annulus 614 was about 1.5 inches, to simulate a cement sheath. The annular regions 615–617 had radial thicknesses of 2 inches, 3 inches, and 5.75 inches, respectively, to simulate different sections of formation about a borehole. The casing 606 and each annulus 614–617 were separately pumped and valved so that each individual region could be isolated and filled or emptied as required. The formation and cement annulus materials were simulated using loose-packed sandstone gravel. The formation materials had a porosity of about 40%.

Each tracer was used in water-soluble form, and added to fresh water in a supply barrel (not shown) in sufficient concentration to give count rates in the range of 500–1000 gamma ray API units. This corresponded to radioactivity levels of only a few tens of microcuries. The tracer-tagged water was directed into the formation by a peristaltic pump (not shown), driven by a reversible electric motor (not shown).

Background measurements were made with fresh water in the annuli 614–617, and then gamma ray spectra were measured after successively filling each annulus from the outermost 617 to the innermost 614, and then filling the casing 606 for the final measurement. The tracer spectrum for each individual annulus was obtained by subtracting the spectra from adjoining regions as appropriate.

The tracers comprised $^{198}$Au and $^{46}$Sc isotopes, as shown in Table 2 (below).

TABLE 2

| TRACER | ISO-TOPE | HALF-LIFE | GAMMA-RAY ENERGY (keV) | INTEN-SITY |
|---|---|---|---|---|
| Gold-198 | $^{198}$Au | 2.70 days | 412 | 0.96 |
|  |  |  | 676 | 0.01 |
| Scandium-46 | $^{46}$Sc | 83.8 days | 889 | 1.00 |
|  |  |  | 1121 | 1.00 |

Two gamma ray spectroscopy tools were used to collect the tracer spectra: Halliburton's CSNG and TracerScan tools. The CSNG tool included a low atomic number ("low-Z") toolcase, to facilitate observation of photoelectric gamma rays. The second tool was a small diameter (1 11/16 inch) TracerScan tool, that included features such as a 1 inch diameter detector crystal, a steel tool housing, and a non-coincidence gain stabilization system.

The curve 504 represents data points taken using the low-Z CSNG tool to measure different radial distributions of the isotope $^{198}$Au. Also concurrent with the curve 504 are data points taken using the TracerScan tool with different radial distributions of the isotope $^{46}$Sc, and data points taken using the TracerScan tool with different distributions of the $^{198}$Au isotope. The curve 506 represents data points taken using the low-Z CSNG tool with differing distributions of the isotope $^{46}$Sc.

To aid in interpreting these results, a straight line 503 was drawn between the coordinates (0", −45°) and (30", +135°) of FIG. 5. These values correspond to the limits of the test configuration, since the limits borehole-formation angle are −45° and +135°, and the limits of the penetration diameter are 0" and 30". Detected gamma ray energy beyond 30 inches is negligible. Initially, at least, the line 503 was believed to nominally represent the relationship between borehole-formation angle and penetration diameter. At −45°, for instance, with the formation component being highest, one would expect a small penetration distance, i.e., near zero. Analogously, at 135°, the formation component would be greatest (corresponding to a strong concentration of isotope in the formation), and the borehole component would be smallest.

Data with borehole-formation angles less than 45° (not shown) were clustered somewhat to the left of the line 503, near the penetration distance of 7.5 inches. However, other data with borehole-formation angles greater than 45° exhibited a wider distribution, between the lines 504 and 506. Moreover, field data yielded even more widely distributed borehole-formation angles, with some variations above the line 506. These variations were presumably due to geometrical effects not easily modeled in the laboratory. To reconcile these observations and establish relationships over the entire physical range, the line 503 was modified by defining a two-segment functionality, as illustrated by Equations 12-13 (below).

$$\text{annular diameter} = 0.08523 * \theta + 3.835 \quad [12]$$

$$(-45° < \theta < +43°)$$

and $$\text{annular diameter} = 0.244 * \theta - 3.016 \quad [13]$$

$$(+43° < \theta < +135°)$$

The linear relationships of Equations 12-13 are shown in FIG. 5 as a line 510, having segments 510a and 510b. Equations 12-13 were intended to smoothly cover the entire meaningful range of borehole-formation angles while maintaining greatest accuracy in the range of 5-15 inches of diameter. With borehole-formation angles greater than 43°, then, most data can be grouped into a fan region 512, located between the segment 510b and the curve 504.

Therefore, in determining the relationship between penetration distance and borehole-formation angle for use in task 322, theoretical and laboratory results dictate that the penetration distance for a borehole-formation angle should be found as follows:

1. For borehole-formation angles less than 43°, the penetration diameter should be found by using the line segment 510a.

2. For borehole-formation angles greater than 43°, the penetration diameter corresponds to data points generally located in the fan region 512, generally located between the line 510 and the curve 504. The use of line segment 510b represents a compromise which does not introduce large errors or affect the interpretation of the resulting log.

While there have been shown what are presently considered to be preferred embodiments of the invention, it will be apparent to those skilled in the art that various changes and modifications can be made herein without departing from the scope of the invention as defined by the appended claims. For instance, the present invention may also be applied in conjunction with open hole well logging, i.e. in non-cased borehole environments. Moreover, instead of using a water-filled casing to simulate borehole isotope concentrations, a radioactive sheath such as a calibration sleeve doped with the desired radioactive isotope(s) may be used to surround the gamma ray tool during simulated borehole measurements.

APPENDIX

| Tracer | Isotope | Half-Life (days) | Gamma-Ray Energy (keV) | Intensity | Dose Rate (mrem/h/mCi) | MPC Sol/Insol ($\mu$Ci/mL) |
|---|---|---|---|---|---|---|
| Gold* | $^{198}$Au | 2.70 | 412 | 0.96 | 2.3 | $5 \times 10^{-5}/5 \times 10^{-5}$ |
|  |  |  | 676 | 0.01 |  |  |
| Xenon | $^{133}$Xe | 5.25 | 81 | 0.36 | 0.1 | —/— |
| Iodine* | $^{131}$I | 8.04 | 284 | 0.06 | 2.2 | $3 \times 10^{-7}/6 \times 10^{-5}$ |
|  |  |  | 364 | 0.81 |  |  |
|  |  |  | 637 | 0.07 |  |  |
|  |  |  | 723 | 0.02 |  |  |
| Rubidium | $^{86}$Rb | 18.7 | 1077 | 0.09 | 0.5 | $7 \times 10^{-5}/2 \times 10^{-5}$ |
| Chromium | $^{51}$Cr | 27.7 | 320 | 0.10 | 0.2 | $2 \times 10^{-3}/2 \times 10^{-3}$ |
| Iron | $^{59}$Fe | 44.6 | 1099 | 0.57 | 6.4 | $6 \times 10^{-5}/5 \times 10^{-5}$ |
|  |  |  | 1292 | 0.43 |  |  |
| Antimony | $^{124}$Sb | 60.2 | 606 | 1.05 | 9.8 | $2 \times 10^{-5}/2 \times 10^{-5}$ |
|  |  |  | 720 | 0.15 |  |  |
|  |  |  | 1353 | 0.05 |  |  |
|  |  |  | 1691 | 0.49 |  |  |
|  |  |  | 2091 | 0.06 |  |  |
| Strontium | $^{85}$Sr | 64.8 | 514 | 0.99 | 3.0 | $1 \times 10^{-4}/2 \times 10^{-4}$ |
| Cobalt | $^{58}$Co | 70.8 | 511 | 0.15 | 5.5 | $1 \times 10^{-4}/9 \times 10^{-4}$ |
|  |  |  | 811 | 0.99 |  |  |
| Iridium* | $^{192}$Ir | 74.0 | 311 | 1.42 | 4.8 | $4 \times 10^{-5}/4 \times 10^{-5}$ |
|  |  |  | 468 | 0.48 |  |  |
|  |  |  | 603 | 0.18 |  |  |
| Scandium* | $^{46}$Sc | 83.8 | 889 | 1.00 | 10.9 | $4 \times 10^{-5}/4 \times 10^{-5}$ |
|  |  |  | 1121 | 1.00 |  |  |
| Zinc | $^{65}$Zn | 244 | 511 | 0.015 | 2.7 | $1 \times 10^{-4}/2 \times 10^{-4}$ |
|  |  |  | 1116 | 0.51 |  |  |
| Silver | $^{110}$Ag | 250 | 666 | 1.32 | 14.3 | $3 \times 10^{-5}/3 \times 10^{-5}$ |
|  |  |  | 773 | 0.34 |  |  |
|  |  |  | 885 | 0.73 |  |  |
|  |  |  | 937 | 0.34 |  |  |
|  |  |  | 1384 | 0.24 |  |  |
|  |  |  | 1502 | 0.18 |  |  |
| Cobalt | $^{57}$Co | 271 | 122 | 0.86 | 0.9 | $5 \times 10^{-5}/4 \times 10^{-5}$ |
|  |  |  | 136 | 0.11 |  |  |
| Cobalt | $^{60}$Co | 1925 | 1173 | 1.00 | 13.2 | $5 \times 10^{-5}/3 \times 10^{-5}$ |
|  |  |  | 1332 | 1.00 |  |  |
| Krypton | $^{85}$Kr | 3098 | 514 | 0.004 | 0 | —/— |

What is claimed is:

1. A well logging method comprising the steps of:
   (a) injecting materials containing at least one radioactive tracer isotope into a cased borehole, an annular region surrounding the cased borehole, and a formation region surrounding the annular region;
   (b) positioning a gamma ray detector at a selected depth in the borehole and sensing gamma ray energy emitted by the tracer isotopes to generate a plurality of spectrum signals representative of each tracer isotope's gamma ray spectrum;
   (c) applying empirically developed gamma ray base spectra for borehole and formation gamma ray spectrum emissions for each tracer isotope to the plurality of spectrum signals to generate formation and borehole spectrum signal components to form a composite spectrum signal;
   (d) generating a borehole formation angle corresponding to a trigonometric relationship that is a function of the formation and borehole spectrum signal components of the composite spectrum signal; and
   (e) applying an empirically developed relationship for each tracer isotope to the borehole formation angle to generate a penetration signal representative of the penetration of the tracer isotope into the annular and formation regions.

2. The method of claim 1, wherein step (b) further includes transmitting the plurality of spectrum signals to the surface.

3. The method of claim 1, wherein steps (b) through (e) are performed as a function of the depth of the gamma ray detector in the borehole.

4. The method of claim 1, wherein step (c) further includes a step of applying a weighted least squares process to the plurality of spectrum signals.

5. The method of claim 1, wherein step (b) further includes a step of consolidating the plurality of spectrum signals to reduce statistical variation.

6. The method of claim 1, wherein step (b) further includes a step of dividing each spectrum signal into a plurality of channels, each channel representative of a range of gamma ray energy.

7. The method of claim 1, wherein the empirically developed borehole gamma ray base spectrum is developed by filling a simulated borehole with radioactive isotopes and positioning a gamma ray spectroscopy tool in the simulated borehole to develop a base spectrum.

8. The method of claim 1, wherein the empirically developed borehole gamma ray base spectrum is developed by sheathing a gamma ray spectroscopy tool with a radioactive sleeve.

9. The method of claim 1, wherein the empirically developed formation gamma ray base spectrum is developed by placing radioactive isotopes in a simulated formation at predefined distances from a simulated borehole and introducing a gamma ray spectroscopy tool into the borehole to measure gamma ray emissions by the radioactive isotopes, the gamma ray emissions being attenuated by intervening materials in the simulated formation.

10. The method of claim 1, further including a step of recording the penetration signal.

11. The method of claim 10, wherein the penetration signal is recorded electronically.

12. The method of claim 1, further including a step of visually displaying the penetration signal.

13. The method of claim 12, wherein the penetration signal is displayed electronically.

14. The method of claim 1, wherein one of the radioactive tracers comprises an isotope of Scandium.

15. The method of claim 1, wherein one of the radioactive tracers comprises an isotope of Gold.

16. The method of claim 1, wherein one of the radioactive tracers comprises an isotope of Antimony.

17. The method of claim 1, wherein one of the radioactive tracers comprises an isotope of Iridium.

18. A well logging method comprising the steps of:
   (a) injecting materials containing at least one radioactive tracer isotope into an uncased borehole and a formation region surrounding the borehole;
   (b) positioning a gamma ray detector at a selected depth in the borehole and sensing gamma ray energy emitted by the tracer isotopes to generate a plurality of spectrum signals representative of each tracer isotope's gamma ray spectrum;
   (c) applying empirically developed gamma ray base spectra for borehole and formation gamma ray spectrum emissions for each tracer isotope to the plurality of spectrum signals to generate formation and borehole spectrum signal components to form a composite spectrum signal;
   (d) generating a borehole formation angle corresponding to a trigonometric relationship that is a function of the formation and borehole spectrum signal components of the composite spectrum signal; and
   (e) applying an empirically developed relationship for each tracer isotope to the borehole formation angle to generate a penetration signal representative of the penetration of the tracer isotope into the formation region.

19. The method of claim 1, wherein step (b) further includes transmitting the plurality of spectrum signals to the surface.

20. The method of claim 1, wherein steps (b) through (e) are performed as a function of the depth of the gamma ray detector in the borehole.

21. The method of claim 18, wherein step (c) further includes a step of applying a weighted least squares process to the plurality of spectrum signals.

22. The method of claim 18, wherein step (b) further includes a step of consolidating the plurality of spectrum signals to reduce statistical variation.

23. The method of claim 18, wherein step (b) further includes a step of dividing each spectrum signal into a plurality of channels, each channel representative of a range of gamma ray energy.

24. The method of claim 18, wherein the empirically developed borehole gamma ray base spectrum is developed by filling a simulated borehole with radioactive isotopes and positioning a gamma ray spectroscopy tool in the simulated borehole to develop a base spectrum.

25. The method of claim 18, wherein the empirically developed borehole gamma ray base spectrum is developed by sheathing a gamma ray spectroscopy tool with a radioactive sleeve.

26. The method of claim 18, wherein the empirically developed formation gamma ray base spectrum is developed by placing radioactive isotopes in a simulated formation at predefined distances from a simulated borehole and introducing a gamma ray spectroscopy tool into the borehole to measure gamma ray emissions by the radioactive isotopes, the gamma ray emissions being attenuated by intervening materials in the simulated formation.

27. The method of claim 18, further including a step of recording the penetration signal.

28. The method of claim 27, wherein the penetration signal is recorded electronically.

29. The method of claim 18, further including a step of visually displaying the penetration signal.

30. The method of claim 29, wherein the penetration signal is displayed electronically.

31. The method of claim 18, wherein one of the radioactive tracers comprises an isotope of Scandium.

32. The method of claim 18, wherein one of the radioactive tracers comprises an isotope of Gold.

33. The method of claim 18, wherein one of the radioactive tracers comprises an isotope of Antimony.

34. The method of claim 18, wherein one of the radioactive tracers comprises an isotope of Iridium.

* * * * *